(12) United States Patent
Shen et al.

(10) Patent No.: US 11,316,431 B2
(45) Date of Patent: Apr. 26, 2022

(54) CONCENTRATION CONTROL CIRCUIT HAVING VOLTAGE FEEDBACK AND CLOCK GENERATION CIRCUITRY

(71) Applicant: Silergy Semiconductor Technology (Hangzhou) LTD, Hangzhou (CN)

(72) Inventors: Zhiyuan Shen, Hangzhou (CN); Kaiwei Yao, Sunnyvale, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 42 days.

(21) Appl. No.: 16/903,600

(22) Filed: Jun. 17, 2020

(65) Prior Publication Data

US 2020/0412233 A1  Dec. 31, 2020

(30) Foreign Application Priority Data

Jun. 27, 2019  (CN) .......................... 201910569851.0

(51) Int. Cl.
*H02M 3/158* (2006.01)
*H02M 1/00* (2006.01)

(52) U.S. Cl.
CPC ....... *H02M 3/1586* (2021.05); *H02M 1/0043* (2021.05); *H02M 1/0025* (2021.05)

(58) Field of Classification Search
CPC .......................... H02M 3/1586; H02M 1/0043
See application file for complete search history.

(56) References Cited

U.S. PATENT DOCUMENTS

| | | | |
|---|---|---|---|
| 5,528,481 A | 6/1996 | Caldeira et al. | |
| 8,310,846 B2 | 11/2012 | Piazzesi | |
| 8,917,068 B2 | 12/2014 | Chen et al. | |
| 9,331,588 B2 | 5/2016 | Chen | |
| 9,762,113 B2 | 9/2017 | Chen et al. | |
| 2005/0001597 A1* | 1/2005 | Walters | H02J 1/102 323/222 |
| 2015/0078041 A1 | 3/2015 | Huang | |
| 2015/0311810 A1 | 10/2015 | Chen et al. | |
| 2017/0047853 A1 | 2/2017 | Chen et al. | |
| 2018/0041117 A1* | 2/2018 | Gong | H03L 7/08 |

* cited by examiner

*Primary Examiner* — Alex Torres-Rivera

(57) ABSTRACT

A concentration control circuit can include: a voltage feedback circuit configured to generate a current reference signal representing an error between a voltage reference signal and an output voltage feedback signal shared by each of a plurality of power stage circuits of a multi-phase power converter to adjust a respective phase current; and a clock signal generation circuit configured to generate a clock signal to adjust at least one of switching frequency and phase of each of the power stage circuits, where the clock signal is adjusted in accordance with a change of the current reference signal.

20 Claims, 7 Drawing Sheets

CONCENTRATION CONTROL CIRCUIT HAVING VOLTAGE FEEDBACK AND CLOCK GENERATION CIRCUITRY

RELATED APPLICATIONS

This application claims the benefit of Chinese Patent Application No. 201910569851.0, filed on Jun. 27, 2019, which is incorporated herein by reference in its entirety.

FIELD OF THE INVENTION

The present invention relates to the field of power electronics, and more particularly to multi-phase power converters and associated control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
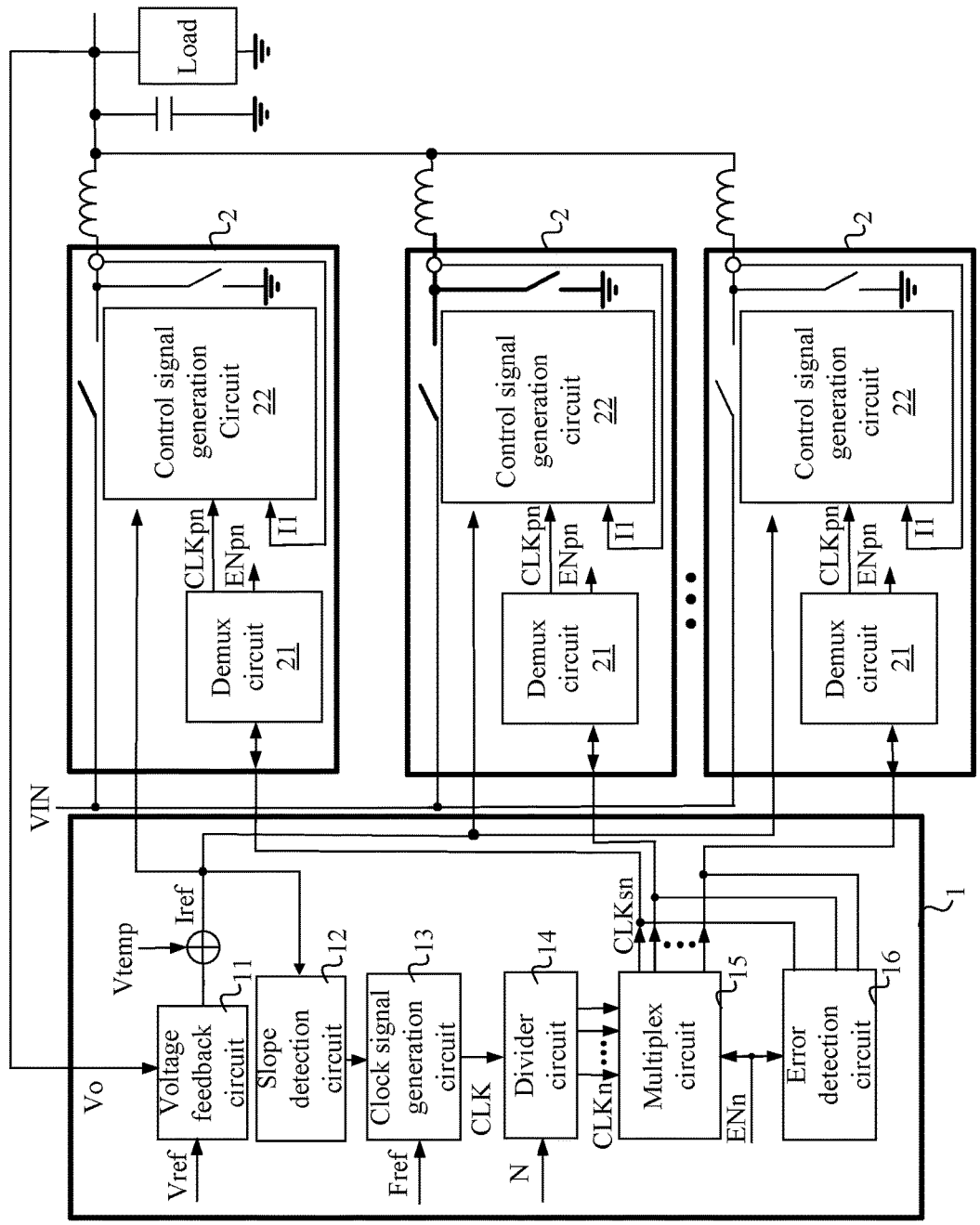
FIG. 1 is a schematic block diagram of an example multi-phase power converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

With the development of central processing unit (CPU), general processing unit (GPU), and artificial intelligence (AI) chips and devices, power supply circuits with low voltage, large current, high efficiency, and small volume are widely used. However, there is a limit to the power of a single-phase power supply circuit under the influences of inductors, process of MOSFET transistors, and packages. As a result, a multi-phase power supply circuit may be utilized, including multiple single-phase power supply circuits. Since current sharing is required for this approach, the controller can sample the current of each phase and an extra current sharing circuit may be used to realize current sharing control. In addition, an interleaving circuit can be used in the circuit to guarantee that the phases of multiple single-phase power supply circuits are interleaved. In this way, current ripple can be reduced. For a fixed frequency control method, phase-interleaving is relatively easy to utilize, but the dynamic response can be slow due to the fixed frequency, which may not meet CPU power supply demands. Moreover, for a variable frequency control method, the dynamic response is relatively fast. However, a phase-locked loop circuit may be required in each single-phase power supply circuit of the multi-phase power supply circuit to adjust the phase of each single-phase power supply circuit, which can result in more complex control.

In one embodiment, a concentration control circuit can include: (i) a voltage feedback circuit configured to generate a current reference signal representing an error between a voltage reference signal and an output voltage feedback signal shared by each of a plurality of power stage circuits of a multi-phase power converter to adjust a respective phase current; and (ii) a clock signal generation circuit configured to generate a clock signal to adjust at least one of switching frequency and phase of each of the power stage circuits, where the clock signal is adjusted in accordance with a change of the current reference signal.

Referring now to FIG. 1, shown is a schematic block diagram of an example multi-phase power converter, in accordance with embodiments of the present invention. The multi-phase power converter can include a control circuit and multiple power stage circuits. The multiple power stage circuits can receive one input voltage VIN, and may generate one output voltage. In this example, each of the power stage circuits is a buck circuit. The control circuit can include "concentration" control circuit 1 and multiple single-phase control circuits. Each single-phase control circuit and two power switches of the buck circuit may form power circuit 2. Here, concentration control circuit 1 can generate current reference signal Iref according to voltage reference signal Vref and output voltage feedback signal Vo.

Further, each single-phase control circuit can adjust the phase current I1 of each power circuit 2. Moreover, concentration control circuit 1 may generate phase multiplexer signal CLKsn (n=1, 2, ..., N) for each power circuit 2 in accordance with phase enabling signal ENn (n=1, 2, ..., N) and phase clock signal CLKn (n=1, 2, ..., N) for each power circuit 2. In addition, phase multiplexer signal CLKsn can adjust the switching frequency and/or the phase of the corresponding power circuit, and enable the corresponding power circuit. Further, phase clock signal CLKn may be obtained by dividing the frequency of clock signal CLK, and clock signal CLK can adjust the switching frequency and the phase of the multi-phase power converter.

Concentration control circuit 1 can include voltage feedback circuit 11, slope detection circuit 12, clock signal generation circuit 13, divider circuit 14, and multiplexer circuit 15. For example, voltage feedback circuit 11 can generate a voltage compensation signal serving as current reference signal Iref. Optionally, average value Vtemp of temperature detection signal Vtempn (n=1, 2, . . . , N) of each power circuit can be superimposed on the voltage compensation signal, in order to generate a temperature current reference signal serving as current reference signal Iref, such that the phase current for each power circuit can be adjusted based on temperature requirements. For example, concentration control circuit 1 can obtain average value Vtemp of temperature detection signal Vtempn (n=1, 2, . . . , N) of each power circuit through a temperature detection pin. Also, each temperature detection circuit in each power circuit 2 can be coupled to the temperature detection pin through a resistor, and the voltage across the temperature detection pin represents average value Vtemp.

Slope detection circuit 12 may generate slope detection signal Vd by detecting the slope of current reference signal Iref to represent a change rate of current reference signal Iref. Those skilled in the art will recognize that the change rate of current reference signal Iref can be obtained by way of other approaches. Clock signal generation circuit 13 can generate clock signal CLK according to frequency reference signal Fref. Optionally, clock signal generation circuit 13 can generate clock signal CLK according to frequency reference signal Fref and the change rate of current reference signal Iref. Thus, the influence of the change of current reference signal Iref can be added to clock signal CLK, in order to adjust the switching frequency and/or phase of the multi-phase power converter. Therefore, the switching frequency can be increased when the load suddenly changes to be heavier, and the switching frequency may be decreased when the load suddenly changes to be lighter, thereby realizing a fast dynamic response.

Divider circuit 14 can generate phase clock signal CLKn corresponding to power circuit 2 one by one according to clock signal CLK, preset phase-number N, and the timing of each phase. Multiplexer circuit 15 can receive phase clock signal CLKn generated from divider circuit 14 and phase enabling signal ENn, in order to generate phase multiplexer signals CLKsn corresponding to each power circuit 2. Moreover, phase multiplexer signal CLKsn can adjust the frequency and/or phase of the corresponding power circuit 2 and enable the corresponding power circuit 2. For example, phase multiplexer signal CLKsn may have three different levels, an active level (e.g., high level) of the phase clock signal can be superimposed on an active level of the phase enabling signal, such that both clock information and enabling information can be included in one signal. Further, concentration control circuit 1 can also include error detection circuit 16 coupled with multiplexer circuit 15 to detect the current or voltage level signal or waveform signal on the output terminals of multiplexer circuit 15, in order to determine the type of the errors of corresponding power circuit according to the preset current or voltage level signal or waveform signal.

Further, each single-phase control circuit can include demultiplexer circuit 21 that can receive phase multiplexer signal CLKsn. Phase multiplexer signal CLKsn may be divided into phase-dividing clock signal CLKpn and phase-dividing enabling signal ENpn. Also, phase-dividing clock signal CLKpn may represent the switching frequency of the corresponding power circuit 2 and phase-dividing enabling signal ENpn, which can enable the corresponding power circuit 2. That is, each phase clock signal CLKn and each phase enabling signal ENn in concentration control circuit 1 may be synthesized to be phase multiplexer signal CLKsn for each power circuit 2. Phase multiplexer signal CLKsn can be divided into phase-dividing clock signal CLKpn and phase-dividing enabling signal ENpn in each power circuit 2. Therefore, concentration control circuit 1 may transmit the corresponding clock signal and enabling signal to the corresponding power circuit 2 only by one transmission line.

Each single-phase control circuit can include control signal generation circuit 22 that receives current reference signal Iref, phase-dividing clock signal CLKpn, and phase-dividing enabling signal ENpn, in order to generate switching control signals for the power stage circuit in each power circuit 2, thereby adjusting the switching state of the corresponding power stage circuit. In particular embodiments, current sharing control can be realized by voltage outer loop control and current inner loop control, such that the concentration control circuit doesn't need to generate extra sharing current with the utilization of pins in order to detect each phase current. Also, the frequency of the clock signal may be adjusted according to the change rate of the current reference signal, such that the switching frequency is adjusted when the load suddenly changes to realize fast dynamic response.

Figure 2:
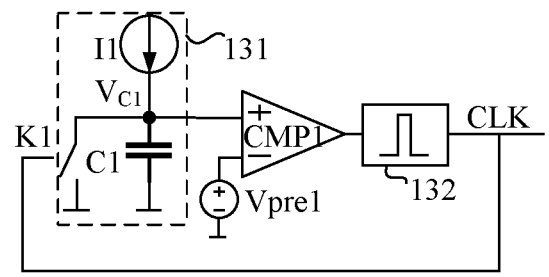
FIG. 2 are schematic block and waveform diagrams of a first example clock signal generation circuit, in accordance with embodiments of the present invention.
Figure 2:
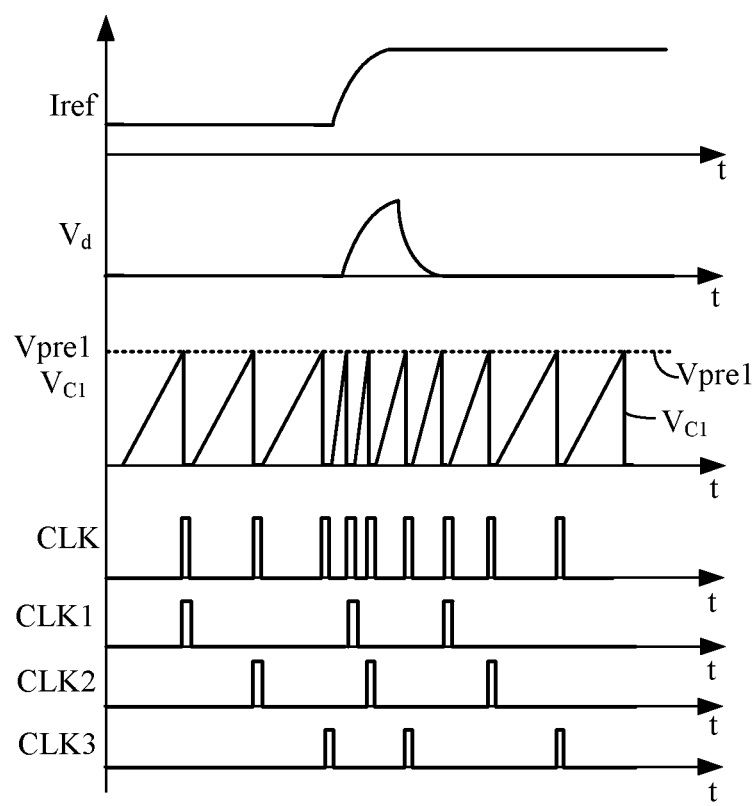

Referring now to FIG. 2, shown are schematic block and waveform diagrams of a first example clock signal generation circuit, in accordance with embodiments of the present invention. In this particular example, clock signal generation circuit 12 can include ramp signal generation circuit 131, a comparison circuit including comparator CMP1, and pulse generator 132. Ramp signal generation circuit 131 can generate ramp signal Vc1. For example, ramp signal generation circuit 131 can include current source I1, switch K1, and capacitor C1. Moreover, switch K1 can connect in parallel with capacitor C1. Further, one terminal of current source I1 can connect with the common terminal of switch K1 and capacitor C1. Thus, the voltage across capacitor C1 can rise linearly when switch K1 is off. Capacitor C1 can be short-circuited when switch K1 is turned on and then the voltage across capacitor C1 may transition to be zero. After the process above, ramp signal Vc1 can be generated.

In particular embodiments, in order for the frequency of clock signal CLK to change with frequency reference signal Fref and the change rate of current reference signal Iref, the slope of ramp signal Vc1 can be set to be proportional to the sum of frequency reference signal Fref and slope detection signal Vd. For example, current source I1 can be a controlled current source and the output current of current source I1 can be proportional to the sum of frequency reference signal Fref and slope detection signal Vd; that is to say, I1∝(Fref+Vd. In such a case, the slope of ramp signal Vc1 may be proportional to the sum of frequency reference signal Fref and slope detection signal Vd. Comparator CMP1 can receive ramp signal Vc1 by a non-inverting input terminal, and threshold voltage Vpre1 by the inverting input terminal. Comparator CMP1 can compare ramp signal Vc1 against threshold voltage Vpre1, in order to generate a comparison signal as clock signal CLK. Optionally, the comparison signal generated from comparator CMP1 can further pass through pulse generator 132. Pulse generator 132 can generate a pulse signal with a preset width as clock signal CLK.

Slope detection signal Vd can change along with the change rate of current reference signal Iref. When slope detection signal Vd is increased, the slope of ramp signal Vc1 can be increased. In such a case, ramp signal Vc1 can reach threshold voltage Vpre1 in a relatively short period of time, such that clock signal CLK generated by comparator CMP1 is at a high level. That is, the frequency of clock signal CLK may be increased when slope detection signal Vd is increased. Thus, the switching frequency of the multi-phase power converter can be adjusted when the load suddenly changes, in order to realize a fast dynamic response. When the circuit is in a steady state, slope detection signal Vd can be zero, which may not influence the switching frequency of the multi-phase power converter.

Figure 3:
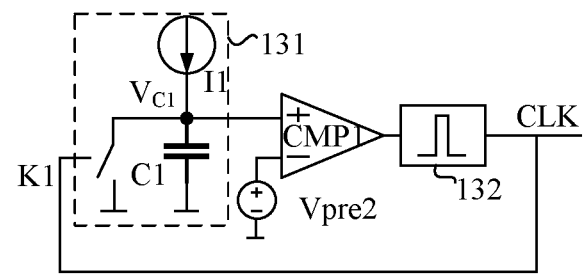
FIG. 3 are schematic block and waveform diagrams of a second example clock signal generation circuit, in accordance with embodiments of the present invention.
Figure 3:
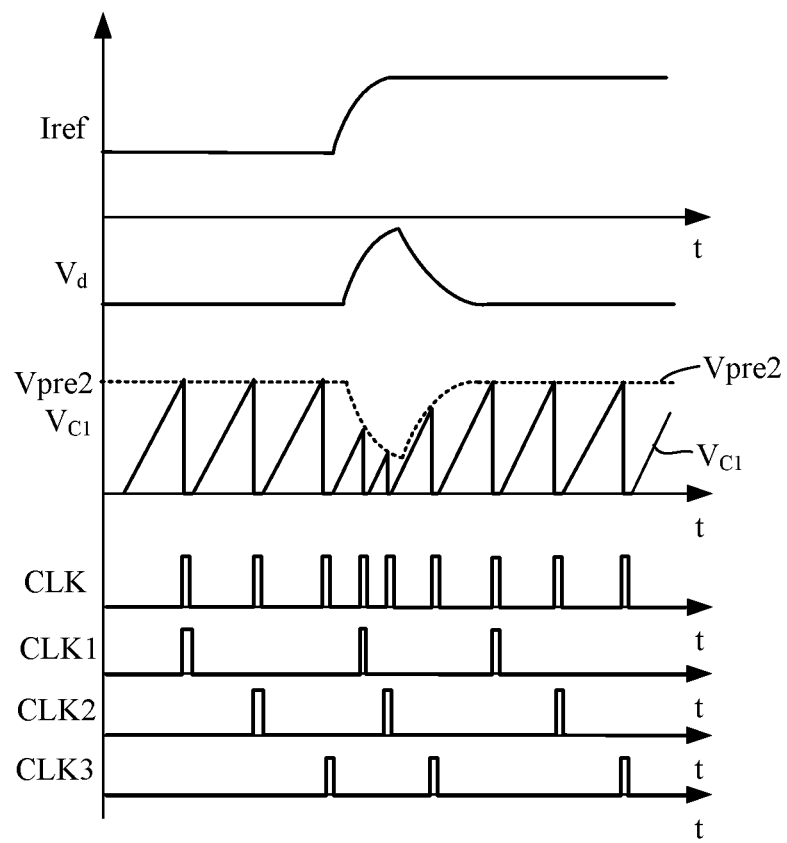

Referring now to FIG. 3, shown are schematic block and waveform diagrams of a second example clock signal generation circuit, in accordance with embodiments of the present invention. In this particular example, in order for the frequency of clock signal CLK to change along with frequency reference signal Fref and the change rate of current reference signal Iref, the slope of ramp signal Vc1 may be fixed, and threshold voltage Vpre2 can be set to be the difference between frequency reference signal Fref and slope detection signal Vd. In this example, slope detection signal Vd changes along with the change rate of current reference signal Iref.

When slope detection signal Vd is increased, threshold voltage Vpre2 can be decreased. In such a case, ramp signal Vc1 can reach threshold voltage Vpre2 in a relatively short period of time. Then, clock signal CLK generated by comparator CMP1 may be at a high level. That is, the frequency of clock signal CLK can be increased when slope detection signal Vd is increased. Thus, the switching frequency of the multi-phase power converter can be adjusted when the load suddenly changes to realize a fast dynamic response. When the circuit is in the steady state, slope detection signal Vd can be zero, which may not influence the switching frequency of the multi-phase power converter. For example, N can be set to be 3 to illustrate the operation process for divider circuit 14. Under that circumstance, phase clock signals CLK1, CLK2, and CLK3 corresponding to three power circuits 2 can in turn be generated.

Figure 4:
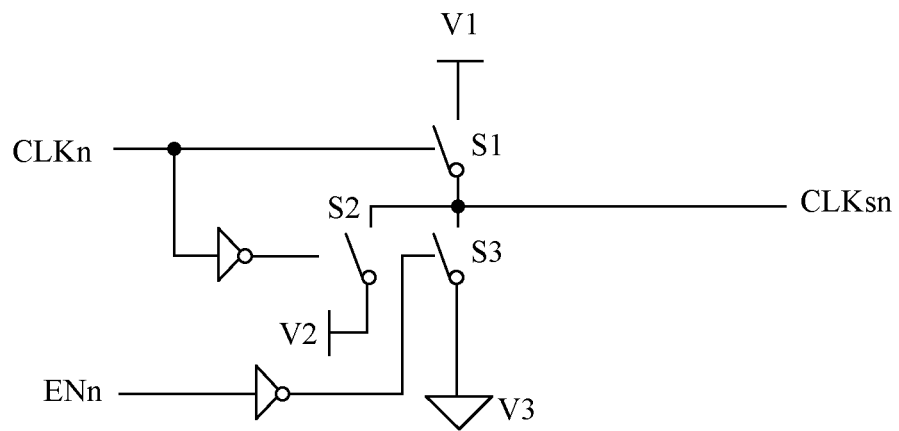
FIG. 4 is a schematic block diagram of an example multiplexer circuit, in accordance with embodiments of the present invention.

Referring now to FIG. 4, shown is a schematic block diagram of an example multiplexer circuit, in accordance with embodiments of the present invention. In this particular example, multiplexer circuit 15 can include switches S1, S2, and S3. Here, level V1 can connect with the output terminal of multiplexer circuit 15 through switch S1, level V2 can connect with the output terminal of multiplexer circuit 15 through switch S2, and level V3 can connect with the output terminal of multiplexer circuit 15 through switch S3. Thus, phase multiplexer signal CLKsn can be at three different levels. In this example, switch S3 can connect to the ground; that is to say, level V3 is 0. In addition, switches S1 and S2 can respectively be controlled by phase clock signal CLKn and an inverting signal of phase clock signal CLKn, and switch S3 may be controlled by an inverting signal of phase enabling signal ENn. For example, level V1 is greater than level V2, and level V2 is greater than level V3.

Figure 5:
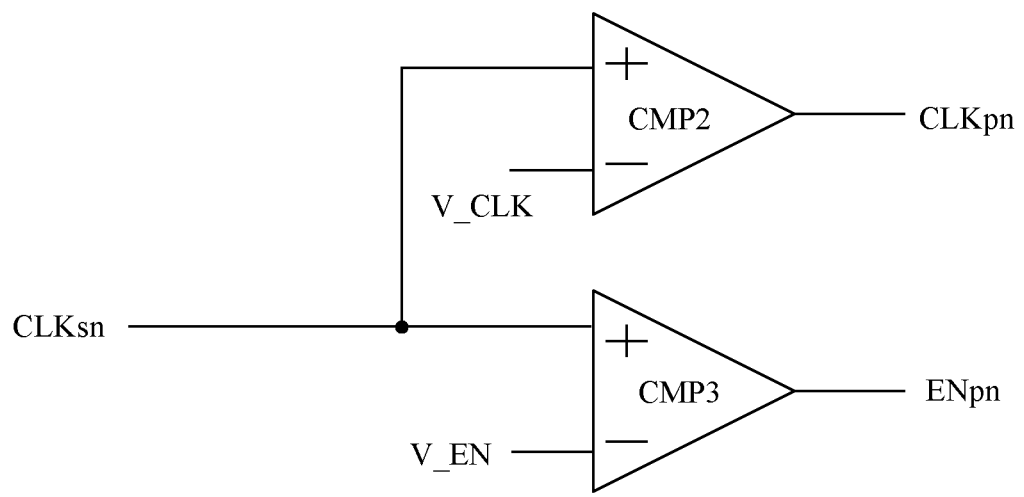
FIG. 5 is a schematic block diagram of an example demultiplexer circuit, in accordance with embodiments of the present invention.

Referring now to FIG. 5, shown is a schematic block diagram of an example demultiplexer circuit, in accordance with embodiments of the present invention. For example, demultiplexer circuit 21 can include a clock comparison circuit and a enabling comparison. For example, the clock comparison circuit can include comparator CMP2. Comparator CMP2 can compare phase multiplexer signal CLKsn against clock reference signal V_CLK, in order to generate phase-dividing clock signal CLKpn. Moreover, clock reference signal V_CLK can be between levels V1 and V2. For example, a non-inverting input terminal of comparator CMP2 can receive phase multiplexer signal CLKsn, and an inverting input terminal of comparator CMP2 can receive clock reference signal V_CLK. When phase multiplexer signal CLKsn is greater than clock reference signal V_CLK, phase-dividing clock signal CLKpn generated by comparator CMP2 can be at a high level. When phase multiplexer signal CLKsn is less than clock reference signal V_CLK, phase-dividing clock signal CLKpn can be at a low level. Thus, phase-dividing clock signal CLKpn representing the clock information may be divided from phase multiplexer signal CLKsn.

For example, the enabling comparison circuit can include comparator CMP3. Comparator CMP3 can compare phase multiplexer signal CLKsn against enabling reference signal V_EN, in order to generate phase-dividing enabling signal ENpn. Moreover, enabling reference signal V_EN can be between levels V2 and V3. For example, a non-inverting input terminal of comparator CMP3 may receive phase multiplexer signal CLKsn, and an inverting input terminal of comparator CMP3 may receive enabling reference signal V_EN. When phase multiplexer signal CLKsn is greater than enabling reference signal V_EN, phase-dividing enabling signal ENpn generated by comparator CMP3 can be at a high level. When phase multiplexer signal CLKsn is less than enabling reference signal V_EN, phase-dividing enabling signal ENpn can be at a low level. Thus, phase-dividing enabling signal ENpn representing the enabling information may be divided from phase multiplexer signal CLKsn.

Figure 6:
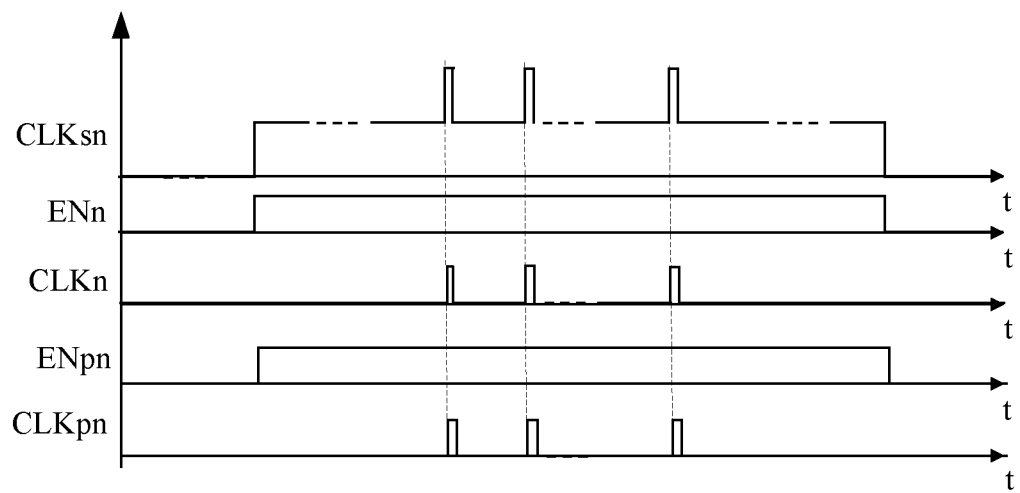
FIG. 6 is a waveform diagram of example operation of the multiplexer and demultiplexer circuits, in accordance with embodiments of the present invention.

Referring now to FIG. 6, shown is a waveform diagram of example operation of the multiplexer and demultiplexer circuits, in accordance with embodiments of the present invention. For example, when phase enabling signal ENn is at a high level and phase clock signal CLKn is at a high level, switch S1 can be turned on, such that phase multiplexer signal CLKsn is at level V1. Thus, phase multiplexer signal CLKsn may be greater than both clock reference signal V_CLK and enabling reference signal V_EN, such that phase-dividing clock signal CLKpn and phase-dividing enabling signal CLKpn are both at a high level. When phase enabling signal ENn is at a high level and phase clock signal CLKn is at a low level, switch S2 can be turned on, such that phase multiplexer signal CLKsn is at level V2. Thus, phase-dividing clock signal CLKpn may be at a low level, and phase-dividing enabling signal ENpn can be at a high level. When phase enabling signal ENn is at a low level, switch S3 can be turned on, and phase multiplexer signal CLKsn may be at level V3. Thus, phase-dividing clock signal CLKpn and phase-dividing enabling signal ENpn may both be at a low level.

Figure 7:
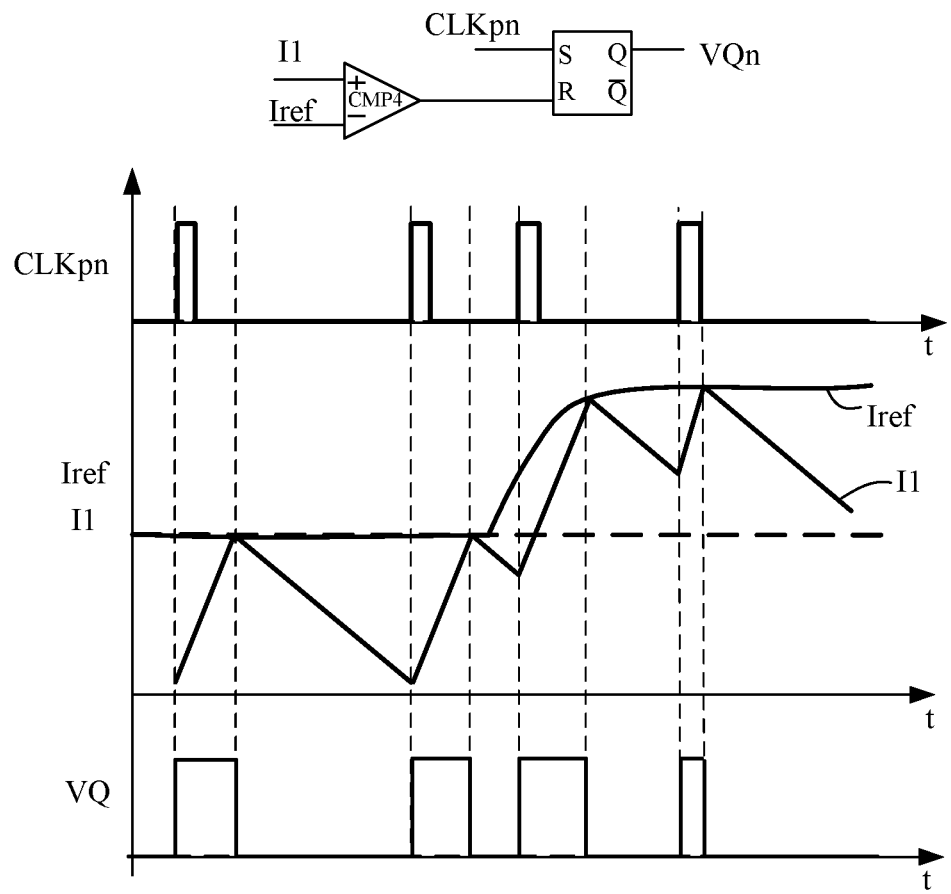
FIG. 7 are schematic block and waveform diagrams of an example control signal generation circuit, in accordance with embodiments of the present invention.

Referring now to FIG. 7, shown are schematic block and waveform diagrams of an example control signal generation circuit, in accordance with embodiments of the present invention. In a multi-phase power converter under peak current control mode example, operation of control signal generation circuit is illustrated herein. For example, control signal generation circuit 22 can include a resetting signal generation including comparator CMP4, and a logic circuit including a SR flip-flop. For example, phase-dividing clock signal CLKpn may serve as a set signal for the SR flip-flop. The power switch of power circuit 2 can be controlled to be turned on according to phase-dividing clock signal CLKpn. That is to say, the frequency or the turn-on moment of switching control signal VQ can be controlled according to phase-dividing clock signal CLKpn. Also, comparator CMP4 can compare current sample signal I1 against current reference signal Iref.

When current sample signal I1 is equal to current reference signal Iref, a reset signal can be activated to control the power switch to be turned off. That is to say, the resetting signal may be generated to control the period of the high level of switching control signal VQ. Further, control signal generation circuit 22 can also enable or disable the generation of switching control signal VQ according to phase-dividing enabling signal ENpn. For example, the logic circuit can be enabled or disabled by phase-dividing enabling signal ENpn, thereby controlling the generation of switching control signal VQ.

In particular embodiments, current sharing control can be realized by voltage outer loop control and current inner loop control without extra sharing current and centralization control circuitry to detect each phase current, thereby reducing the utilization of pins. Also, the frequency of the clock signal may be adjusted according to the change rate of the current reference signal, such that the switching frequency is adjusted when the load suddenly changes in order to realize fast dynamic response. Further, the errors of each power circuit can be detected by the signal multiplexing method, such that the pins of each power circuit can be reduced. Moreover, a temperature balance between the multiple power circuits can be realized, in order to improve the reliability of the system.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A concentration control circuit, comprising:
   a) a voltage feedback circuit configured to generate a current reference signal representing an error between a voltage reference signal representing an expected output voltage and an output voltage feedback signal representing the output voltage, wherein the current reference signal is shared by each of a plurality of power stage circuits of a multi-phase power converter to adjust a respective phase current; and
   b) a clock signal generation circuit configured to generate a clock signal according to a frequency reference signal and a change of the current reference signal to adjust at least one of switching frequency and phase of each of the power stage circuits, wherein the clock signal is adjusted in accordance with the change of the current reference signal.

2. The concentration control circuit of claim 1, wherein:
   a) the concentration control circuit is configured to generate phase multiplexer signals respectively corresponding to each of the power stage circuits;
   b) each of the phase multiplexer signals comprises one phase enabling signal to enable a corresponding power stage circuit and one phase clock signal to adjust the switching frequency or the phase of the power stage circuit; and
   c) the phase clock signal is obtained by dividing the clock signal.

3. The concentration control circuit of claim 2, further comprising a divider circuit configured to generate the plurality of phase clock signals corresponding to the plurality of power stage circuits respectively, in accordance with a phase number of the multi-phase power converter and a timing of each power stage circuit.

4. The concentration control circuit of claim 2, further comprising a multiplexer circuit configured to receive the phase clock signal and the phase enabling signal, in order to generate the phase multiplexer signal, wherein the phase multiplexer signal has three different levels.

5. The concentration control circuit of claim 4, wherein:
   a) when both the phase enabling signal and the phase clock signal are effective, the phase multiplexer signal is at a first level;
   b) when the phase enabling signal is effective and the phase clock signal is ineffective, the phase multiplexer signal is at a second level;
   c) when the phase enabling signal is ineffective, the phase multiplexer signal is at a third level;
   d) the first level is greater than the second level; and
   e) the second level is greater than the third level.

6. The concentration control circuit of claim 4, further comprising an error detection circuit configured to detect signals on output terminals of the multiplexer circuit, to determine different types of an error corresponding to the power stage circuit according to a preset signal.

7. The concentration control circuit of claim 2, wherein an active level of the phase clock signal is superimposed on an active level of the phase enabling signal, such that the phase clock signal and the phase enabling signal are transmitted by one transmission line.

8. The concentration control circuit of claim 1, wherein the voltage feedback circuit is configured to generate a voltage compensation signal configured as the current reference signal based on the voltage reference signal and the output voltage feedback signal.

9. The concentration control circuit of claim 8, further comprising a temperature detection circuit configured to generate a temperature detection signal that is superimposed on the voltage compensation signal, in order to generate a temperature voltage compensation signal to serve as the current reference signal.

10. The concentration control circuit of claim 1, wherein the clock signal changes in the same direction as a change of a change rate of the current reference signal.

11. The concentration control circuit of claim 1, further comprising a slope detection circuit configured to detect a slope of the current reference signal, in order to generate a slope detection signal.

12. The concentration control circuit of claim 11, wherein the clock signal generation circuit is configured to generate the clock signal according to the slope detection signal and the frequency reference signal.

13. The concentration control circuit of claim 12, wherein the clock signal generation circuit comprises:
   a) a ramp signal generation circuit configured to generate a ramp signal, wherein a slope of the ramp signal is proportional to a sum of the frequency reference signal and the slope detection signal; and
   b) a comparison circuit configured to compare the ramp signal against a threshold voltage, in order to generate the clock signal.

14. The concentration control circuit of claim 12, wherein the clock signal generation circuit comprises:
   a) a ramp signal generation circuit configured to generate a ramp signal having a fixed slope; and
   b) a comparison circuit configured to compare the ramp signal against a threshold voltage, in order to generate the clock signal, wherein the threshold voltage is a difference between the frequency reference signal and the slope detection signal.

15. A control circuit, comprising the concentration control circuit of claim 1, and further comprising a plurality of single-phase control circuits respectively corresponding to each of the power stage circuits.

16. The control circuit of claim 15, wherein the single-phase control circuit comprises a demultiplexer circuit configured to receive a phase multiplexer signal and divide the phase multiplexer signal into a phase-dividing clock signal and a phase-dividing enabling signal, wherein the phase-dividing clock signal represents the switching frequency and the phase of the corresponding power stage circuit, and the phase-dividing enabling signal represents an enabling state of the corresponding power stage circuit.

17. The control circuit of claim 16, wherein the demultiplexer circuit comprises:
   a) a clock comparison circuit configured to compare the phase multiplexer signal against a clock reference signal, in order to generate the phase-dividing clock signal, wherein the clock reference signal is between the first and second levels; and
   b) an enabling comparison circuit configured to compare the phase multiplexer signal against an enabling reference signal, in order to generate the phase-dividing enabling signal, wherein the enabling reference signal is between the second and third levels.

18. The control circuit of claim 17, wherein the single-phase control circuit further comprises a control signal generation circuit configured to receive the current reference signal, the phase-dividing clock signal, and the phase-dividing enabling signal, in order to generate a switching control signal for the corresponding power stage circuit, thereby adjusting a switching state of the power stage circuit.

19. A concentration control circuit, comprising:
   a) a voltage feedback circuit configured to generate a current reference signal representing an error between a voltage reference signal representing an expected output voltage and an output voltage feedback signal representing the output voltage, wherein the current reference signal is shared by each of a plurality of power stage circuits of a multi-phase power converter to adjust a respective phase current;
   b) a clock signal generation circuit configured to generate a clock signal to adjust at least one of switching frequency and phase of each of the power stage circuits, wherein the clock signal is adjusted in accordance with a change of the current reference signal; and
   c) wherein the concentration control circuit is configured to generate phase multiplexer signals respectively corresponding to each of the power stage circuits, each of the phase multiplexer signals comprises one phase enabling signal to enable a corresponding power stage circuit and one phase clock signal to adjust the switching frequency or the phase of the power stage circuit, and the phase clock signal is obtained by dividing the clock signal.

20. The concentration control circuit of claim 19, wherein an active level of the phase clock signal is superimposed on an active level of the phase enabling signal, such that the phase clock signal and the phase enabling signal are transmitted by one transmission line.

\* \* \* \* \*